J. J. MILLER.
WHEEL.
APPLICATION FILED MAR. 18, 1918.

1,303,101.

Patented May 6, 1919.
2 SHEETS—SHEET 1.

Inventor
J. J. Miller

By C. H. Parker

Attorney

J. J. MILLER.
WHEEL.
APPLICATION FILED MAR. 18, 1918.
1,303,101.
Patented May 6, 1919.
2 SHEETS—SHEET 2.
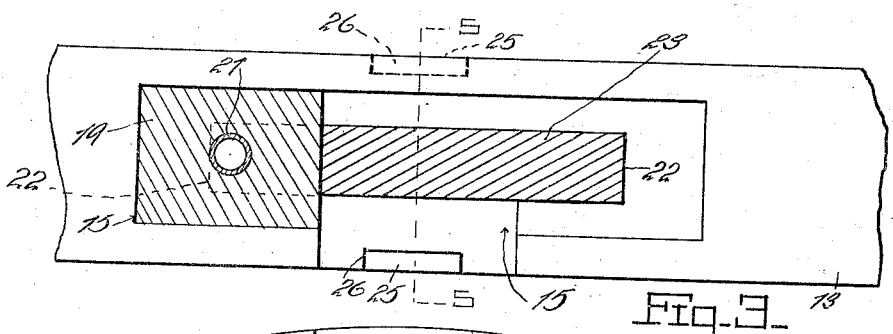
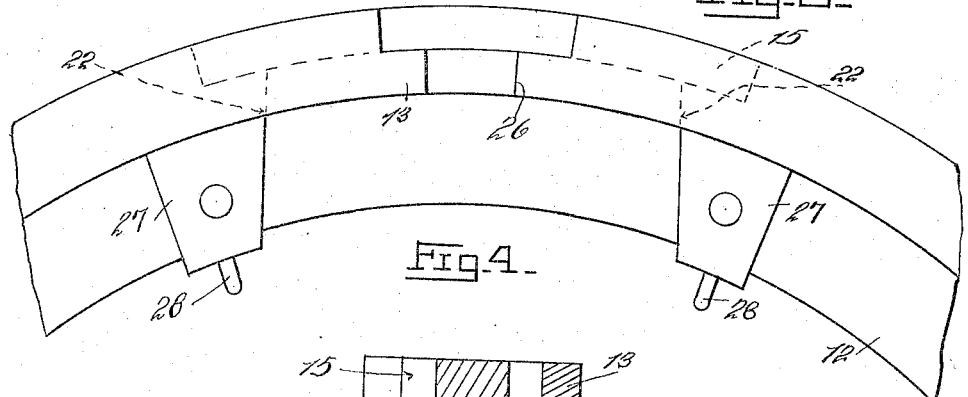
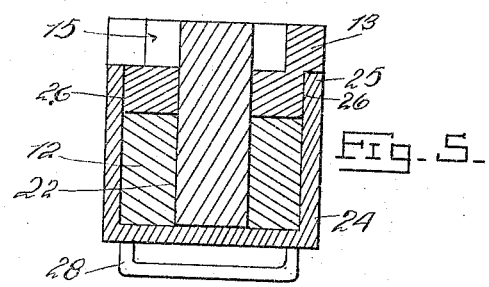
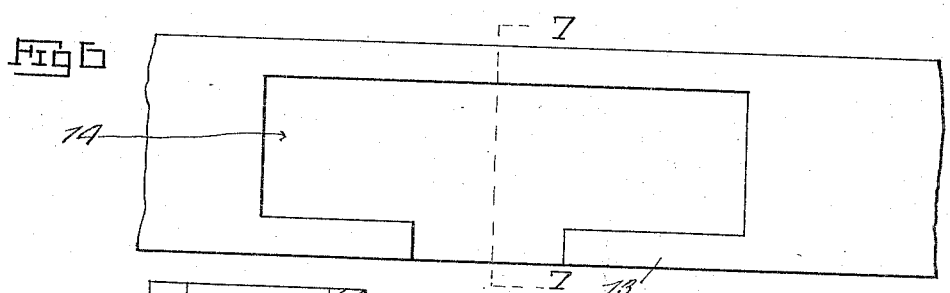
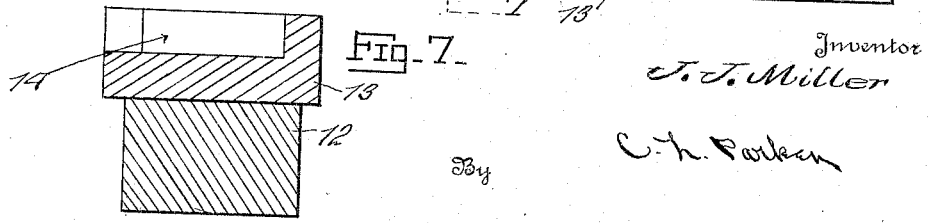

UNITED STATES PATENT OFFICE.

JACOB J. MILLER, OF FLUSHING, NEW YORK, ASSIGNOR OF ONE-THIRD TO PATRICK DONOVAN, OF BURLINGTON, VERMONT, AND ONE-THIRD TO FERDINAND BOEHMER, OF COLCHESTER, VERMONT.

WHEEL.

1,303,101.  Specification of Letters Patent.  Patented May 6, 1919.

Application filed March 18, 1918. Serial No. 223,158.

*To all whom it may concern:*

Be it known that I, JACOB J. MILLER, a citizen of the United States, residing at Flushing, in the county of Queens and State of New York, have invented certain new and useful Improvements in Wheels, of which the following is a specification.

My invention relates to wheels having demountable rims.

An important object of the invention is to provide a wheel of the above mentioned character, the rim of which may be removed therefrom and placed thereon, in a highly expeditious and convenient manner.

A further object of the invention is to provide a wheel of the above mentioned character, which is of simplified construction and is highly convenient in use.

Other objects and advantages of the invention will be apparent during the course of the following description.

Figure 1:
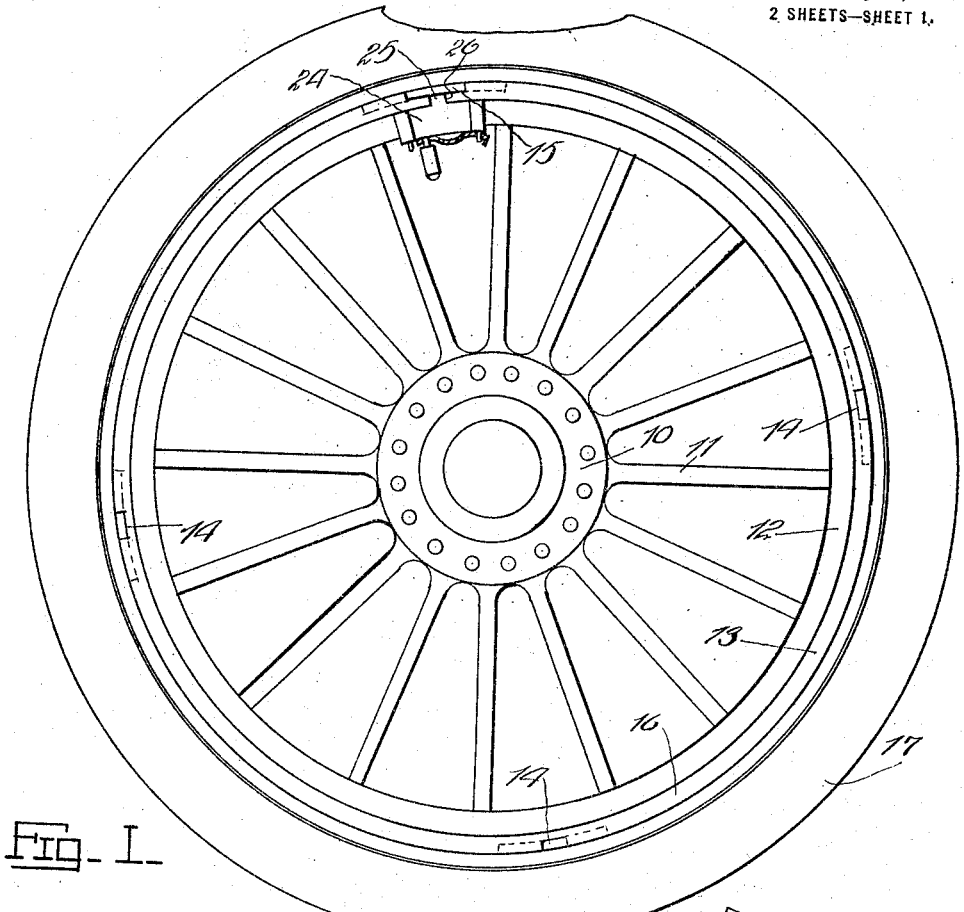
Figure 2:
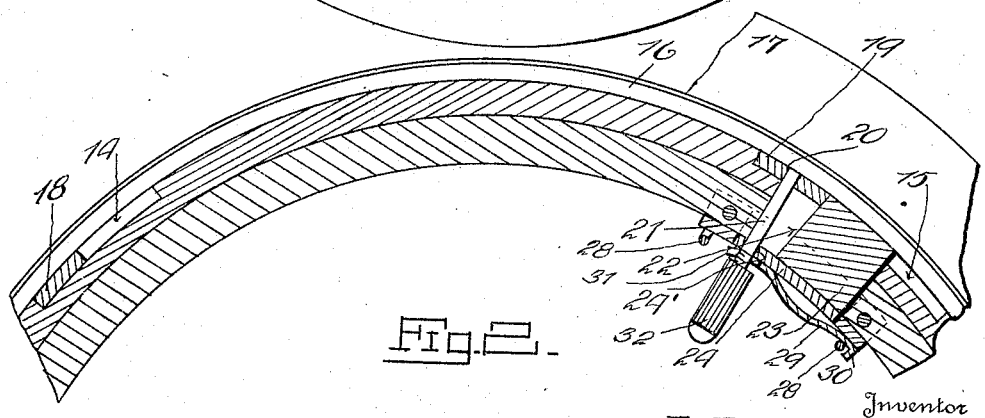

In the accompanying drawings forming a part of this specification and in which like numerals are employed to designate like parts throughout the same, Figure 1 is a side elevation of a wheel embodying my invention, Fig. 2 is an enlarged central vertical sectional view taken in the plane of the wheel, parts being broken away, Fig. 3 is an enlarged fragmentary plan view of the wheel with the demountable rim removed, the lock key or block being shown in section, for the purpose of illustration, Fig. 4 is a side elevation of the same, Fig. 5 is a transverse sectional view taken on line 5—5 of Fig. 3.

Fig. 6 is a fragmentary plan view of a different portion of the wheel, with the demountable rim removed, and Fig. 7 is a transverse sectional view taken on line 7—7 of Fig. 6.

In the drawings, wherein for the purpose of illustration is shown a preferred embodiment of my invention, the numeral 10 designates the hub of a wheel, having spokes 11, to which is secured a felly 12, as is customary.

Rigidly secured to the felly 12 is a permanent inner rim 13, which may be rigidly secured to the felly 12 by any suitable means. The inner rim 13 is provided at spaced intervals with T-shaped recesses 14 and 15 formed upon its periphery as shown more clearly in Figs. 3 and 7.

The numeral 16 designates a demountable rim, preferably formed of metal, and suitably receiving and holding a pneumatic tire 17. This demountable rim carries upon its inner periphery locking lugs 18 and 19. The lugs 18 are adapted to be inserted within the T-shaped recesses 14 while the lug 19 is adapted for insertion within the T-shaped recess 15, as shown. When inserted within the T-shaped recesses, the demountable rim 16 may be turned in either direction, with respect to the inner rim 13, thereby bringing the lugs 18 and 19 into the corresponding ends of the recesses. In the present illustration, the demountable rim 16 has been turned counter-clockwise with respect to the inner rim 13 thereby bringing the lugs 18 and 19 into the left ends of the T-shaped recesses.

As more clearly shown in Fig. 2, the lug 19 is provided with an opening 20, for the passage of the tube 21 of the valve of the tire 17. This tube also passes through a longitudinal opening 22 formed in the inner rim 13 and felly 12.

The numeral 23 designates a locking key or block, which is adapted to be radially disposed within the radial longitudinal opening 22, in contact with one end wall thereof and in contact with the lug 19 thereby serving to lock the lug 19 against clockwise movement with respect to the inner rim 13. The radial key or block 23 is rigidly secured to a casing 24, U-shaped in cross-section, and adapted to receive a portion of the felly 12. The U-shaped casing 24 is provided with oppositely arranged extensions or lips 25, for insertion within recesses 26, formed in the opposite sides of the inner rim 13. The U-shaped casing 24, also has an opening 24', to receive the valve tube 21. The U-shaped casing 24 is arranged between stationary U-shaped stops 27, rigidly attached to the felly 12 by any suitable means. The stops 27 carry staples 28, rigidly attached thereto, as shown. These staples are adapted for the reception of one end of a leaf spring 29, such end being upturned, as shown at 30. The up-turned end 30 of the leaf spring 29 may be inserted within either staple 28. The opposite end of the leaf spring 29 is provided with a longitudinal slot 31, for receiving the tube 21. A cap 32 is screw-threaded upon the tube and contacts with the slotted end of the leaf spring 29 causing the leaf spring to in turn contact with the casing 24 holding the same between the stop members 27.

In placing the demountable rim 16 upon the rim 13, the tube 21 is first passed through the opening 22 and the lug 19 thereby brought into the T-shaped recess 15. The lugs 18 are now moved into proximity to the transverse portion of the T-shaped recesses 14 and moved into the longitudinal portions thereof. The rim 16 may be now turned counter-clockwise with relation to the rim 13, whereby the lugs contact with the left end walls of the T-shaped recesses. This having been done, the U-shaped casing 24 is placed in position between the stop elements 27 and the locking key or block 23 will be positioned within the opening 22, in contact with one end wall thereof and with the end of the lug 19 thereby securely locking the lug in position. The slotted end of the leaf spring 29 is now positioned about the tube 21 and the cap 32 screwed up, thereby securely retaining the casing 24 in place.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A wheel of the character described, comprising an inner rim having T-shaped recesses upon its periphery and a radial longitudinal opening which leads into one recess; a demountable rim having locking lugs to enter the recesses; a tire carried by the demountable rim and having a valve tube adapted to project through the longitudinal opening; a radial locking block to be inserted within the longitudinal opening; a U-shaped casing carrying the block and adapted to straddle the inner rim; and means connected with the valve tube to retain the U-shaped casing in place.

2. A wheel of the character described, comprising an inner rim having T-shaped recesses upon its periphery and a radial longitudinal opening which leads into one recess; a demountable rim having locking lugs to enter the recesses; a tire carried by the demountable rim; a valve tube connected with the tire; a radial locking block to be inserted within the longitudinal opening; a U-shaped casing contacting with the inner end of the locking block; an element having one end thereof connected with the U-shaped casing and its opposite end disposed in proximity to the valve tube; and a cap carried by the valve tube and contacting with the element.

3. A wheel of the character described, comprising an inner rim having recesses upon its periphery and a radial opening which leads into one recess; a demountable rim having locking lugs to enter the recesses; a tire carried by the demountable rim; a valve tube carried by the tire; a radial locking block adapted for insertion within the radial opening; a U-shaped casing having rigid connection with the locking block and provided with an opening for the passage of the valve tube; stop elements connected with the inner rim and adapted to receive the U-shaped casing therebetween; a staple secured to one stop element; a leaf spring having one end adapted for insertion within the staple and the opposite end provided with an opening for the reception of the valve tube; and a dust cap having screw-threaded engagement with the valve tube and adapted to contact with the leaf spring.

In testimony whereof I affix my signature in presence of two witnesses.

JACOB J. MILLER.

Witnesses:
 THEO. E. HOPKINS,
 MITCHELL W. HINSDALE.

Copies of this patent may be obtained for five cents each, by addressing the "Commissioner of Patents, Washington, D. C."